Dec. 5, 1967 W. B. SAMPSON ET AL 3,356,976
QUADRUPOLE MAGNET
Filed Nov. 10, 1965 2 Sheets-Sheet 1

INVENTOR.
WILLIAM B. SAMPSON
RICHARD B. BRITTON
P. GERALD KRUGER

Dec. 5, 1967  W. B. SAMPSON ET AL  3,356,976
QUADRUPOLE MAGNET
Filed Nov. 10, 1965  2 Sheets-Sheet 2

QUADRUPOLE

OCTUPOLE

INVENTOR.
WILLIAM B. SAMPSON
RICHARD B. BRITTON
P. GERALD KRUGER

United States Patent Office 3,356,976
Patented Dec. 5, 1967

3,356,976
QUADRUPOLE MAGNET
William B. Sampson, Bellport, and Richard B. Britton, Setauket, N.Y., and P. Gerald Kruger, Champaign, Ill., assignors to the United States of America as represented by the United States Atomic Energy Commission
Filed Nov. 10, 1965, Ser. No. 507,256
10 Claims. (Cl. 335—216)

ABSTRACT OF THE DISCLOSURE

Compact, high field, high current density multipole magnet having a longitudinally extending aperture formed by rectangular cross-section current sheets with superconductor ribbons arranged in aparallel layers at right angles to the major dimension of the current sheets and having provision for effective cooling of the superconductor ribbons and means for avoiding localized current degradation therein. Specific magnet configurations provided comprise quadrupoles, for producing uniform high field gradient magnetic fields for focusing charged particles in a square cross-section aperture formed by separate current sheets made with ribbons of rectangular cross-section superconductor forming major surfaces having corresponding, spaced normal resistance conductors thereon.

---

This invention relates to multipolar magnets for focusing charged particles in a beam. This invention was made in the course of, or under, a contract with the U.S. Atomic Energy Commission.

In the accelerator described in U.S. Patent 3,171,025 to T. L. Collins, and assigned to the assignee of this invention, multipolar magnets are used to focus charged particles in a beam along a curved or endless axis and to transport the particles over long or short distances in a straight line. FIGS. 3 and 4 of this patent illustrate conventional multipolar magnets having heavy iron members and normal resistance electrical conductors for producing a magnetic aperture having in cross-section a zero field on its axis and an increasing field radially outwardly therefrom. These iron containing multipolar magnets, however, are difficult and complicated to build, heavy and cumbersome to use, and expensive to operate. It is also advantageous efficiently to provide high field gradients, high current densities and easy cooling in a stable multipolar magnet.

It has now been discovered that an insulated conductor can be wound into coils having first and return elements respectively forming flat sided electrically conducting sheets at angles to each other in a simple light weight multipolar magnet. Moreover with the proper selection of conductors and insulation, as described in more detail hereinafter, the system of this invention provides a multipolar magnet that is inexpensive to operate, easy to cool and effectively provides larger field gradients and current densities than were possible heretofore. In one embodiment, the multipolar magnet of this invention comprises four, flat, conducting or current sheets, of predetermined width at right angles to each other forming a rectangular parallel-piped shaped aperture of square cross-section having a zero field along its axis and a uniform field gradient radially outwardly therefrom in which each of the conducting sheets comprises a plurality of layers of continuous insulated superconducting ribbons at right angles to the width of the respective conducting sheets for providing a high current density in the conductors and high field strengths in the aperture without the use of iron members.

It is, therefore, an object of this invention to provide a method and apparatus for the focusing of charged particles.

It is another object to provide an improved multipolar magnet;

It is another object to provide a simple multipolar magnet having a rectangular parallelepiped shaped aperture of square cross-section;

It is another object of this invention to provide a superconducting multipolar magnet;

It is another object to provide for a light weight, simple, easy to fabricate, high field gradient efficient multipolar magnet without the use of iron;

It is a further object to provide multipolar magnets in which a ribbon shaped conductor having an insulating material thereon is wound into coils having first and return elements and the elements are transposed for providing flat sided current sheets at angles to each other;

It is a further object to provide a multipolar magnet in which the magnet comprises a plurality of layers of insulated superconductors;

It is a further object to resist the forces that tend to tear a high field multipolar magnet apart;

It is still a further object to provide for the multipolar focusing of high energy charged particles in a beam circulating around an endless orbit or travelling over long or short distances in a straight line;

It is still a further object to provide for the cryostatic operation of multipolar magnets.

The above and further objects and novel features of this invention will appear more fully from the following detailed description when the same is read in connection with the accompanying drawings. It is to be expressly understood, however, that the drawings are not intended as a definition of the invention but are for the purpose of illustration only.

In the drawings where like parts are marked alike:

Figure 1:
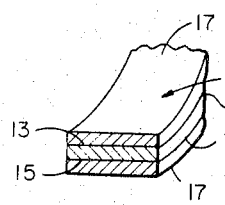
FIG. 1 is a partial cross-section of the insulated conductor of this invention.

Referring to FIG. 1 the conductor of this invention advantageously comprises a long or continuous ribbon shaped conductor 11 (i.e. a sheet with a rectangular cross-section) having flat parallel sides 13 and 15 that are wide in comparison to the ribbon's flat sides or thickness T wherein the sides 13 and 15 thereof are interposed between an insulating material 17. For ease of explanation the thickness T and T' of conductor 11 and insulator 17 are exaggerated.

Advantageously, conductor 11 is a hard superconductor and suitable materials are the $Nb_2Sn$ ribbons coated with an insulation 17 of copper, made by the Radio Corporation of America or National Research Corporation. However, the conductor 11 may be any superconducting material, such as NbZr, NbTI and $V_3Ga$.

In understanding how conductor 11 provides the quadrupole magnet of this invention in accordance with this invention, reference is made to FIGS. 2, 3 , 4 and 5. The coated conductor 11 easily winds into a symmetric coil having a plurality of concentric turns on a suitable cylindrical frame (not shown) to produce a coil in a plane, with the conducting paths of each turn separated by an insulator. The ribbon has a uniform web width and the coil has a height equal to the web width. The coil has an inner diameter and an outer diameter at least equal to the axial length thereof and the difference between the inner and outer diameters is no less than the minimum dimension of the aperture of the magnet desired.

Figure 6:
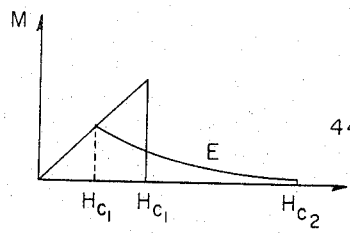
FIG. 6 is a graphical representation of current vs. field in hard and soft superconductors showing one critical field Hc for soft superconductors (soft S.C.) and two critical fields $Hc_1$ and $Hc_2$ for hard superconductors (hard S.C.)
Figure 2:
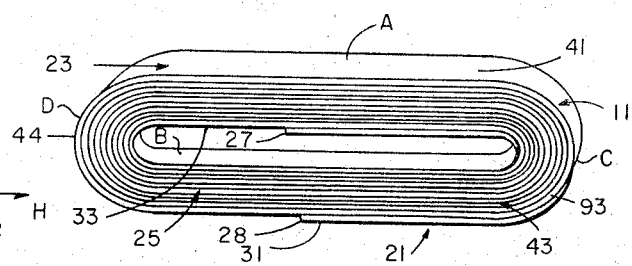
FIG. 2 is a partial three-dimensional view of the conductor of FIG. 1 formed into a race-track shaped configuration.

This coil then deforms in a plane into a multilayered continuous ribbon, race track shaped configuration 21, such as is shown in FIG. 2, the oval shape being of constant width and height having a major axis and a minor axis with a first coil element (or side) 23 and a second coil element (or side) 25 parallel to the major axis. As will be understood in more detail hereinafter, the ends 27 and 28 of the turns of racetrack 21 are shown in different of the the elements 23 or 25 described above of racetrack 21 to provide for easy electrical input and output connections at one end of the racetrack 21.

Figure 4:
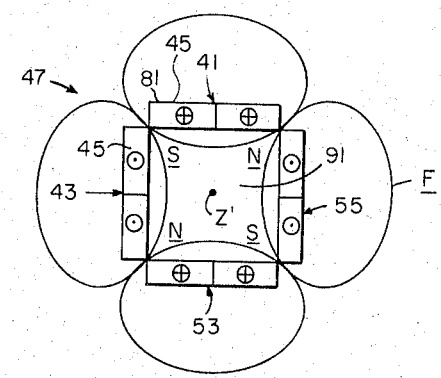
FIG. 4 is a partial cross-section of the quadruple magnet of FIG. 3.

Deformation wraping or translocation twisting causes the outside 31 of racetrack 21 to be disposed adjacent the inside 33 of the racetrack to provide two flat, conducting current sheets 41 and 43 at right angles to each other as shown in FIG. 4 with the circuit connections 27 and 28 adjacent the end 44 thereof and in planes at right angles (FIG. 5) to form a right angle conducting sheet configuration 45. To this end the deforming of the oval shape is accomplished by rotating the first coil element (side 23) through an angle 90 degrees in a plane normal to the major axis of the racetrack 21 and translocating the first coil element (side 23) to a position adjacent to the second coil element (side 25), the surface A of the first coil element 23, corresponding to the above-mentioned outer diameter, and the surface B of the second coil element 25, corresponding to the above-mentioned inner diameter, being at right angles. Suitable adhesive, potting plastic, epoxy resin, or Teflon brand tape holds the sides 23 and 25 rigidly in flat conducting sheets in their original configuration so that during the deforming the turns of the loop ends C and D of the racetrack 21 are free to slip relatively past each other into the concave-convex shaped loop ends E and E' and opposite loop ends F and F' shown in FIG. 3. The reference numerals C', C", D', D" and D''' shown in FIG. 3 indicate corresponding coil ends.

At least two of these deformed right angle shapes 45 (four in FIG. 3) are rigidly maintained and held by suitably clamping the deformed (right angle) shape 45 interposed between suitable clamps G and a pipe H having a square shape outside in cross-section under the clamps G adjacent the deformed right angles shaped configurations 45 to form magnet 47. These clamps G are advantageously Micarta brand phenol formaldehyde but aluminum, stainless steel or copper may also be used.

Figure 3:
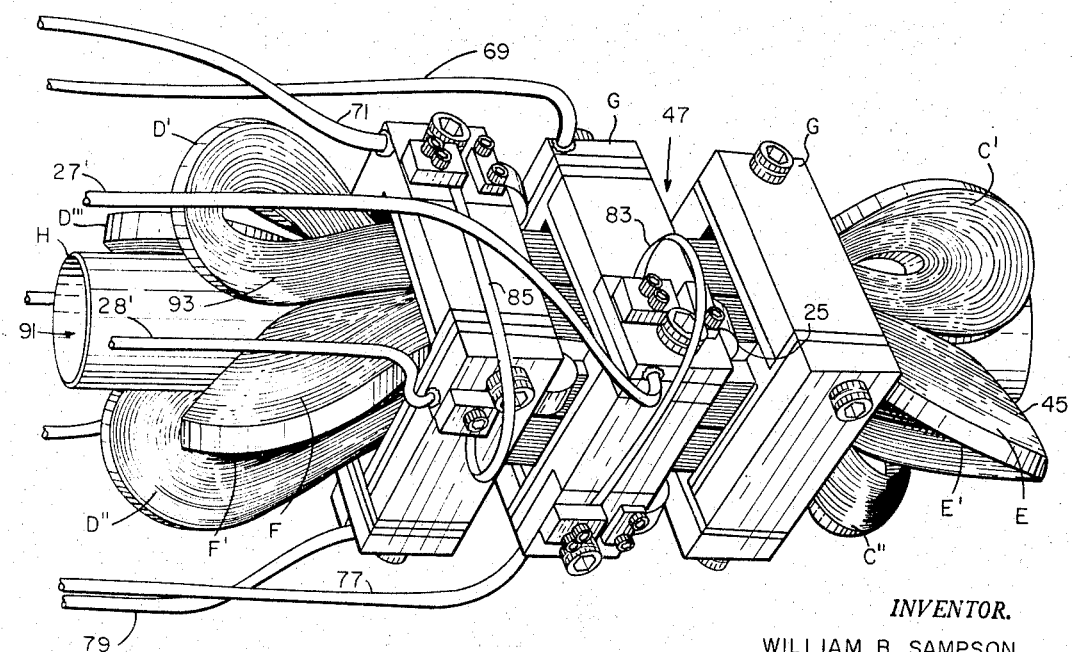
FIG. 3 is a partial three-dimensional view of a quadrupole magnet made from the configuration of FIG. 2 with the clamps and connections therefor.

It will be seen from FIGS. 2, 3 and 4 that each twisted racetrack 45 forms one quarter of a rectangular parallelepiped square cross-section aperture in magnet 47 and one-half of each of the four conducting or current sheets 41, 43, 53 and 55 at right angles to each other. To this end each of four right angle sections corresponding to section 45 in FIGS. 3 and 4 has circuit connections corresponding to connections 27 and 28 connected to suitable leads. Thus right angle section 45 has input and output leads 27' and 28' in planes at right angles to each other, section 51 has input and output leads 69 and 71, section 53 has input and output leads, not shown, and section 55 has input and output leads 77 and 79 all arranged correspondingly in right angle planes respectively. These leads are energized from a suitable electrical energy source to produce the same current flow in each half 81 of each conducting sheet and opposite current flow in the adjacent or return current sheets. Moreover shunt conductors 83 and 85 provide continuous current flow with their leads when conductors 11 are in their superconducting state as shown in FIG. 3.

In one sequence of this invention, ¼" x .002" electrolytically coated copper plated $Nb_3Sn$ ribbon is wound in a plurality of turns into four coils. To this end each initial symmetrical coil is wound on a cylindrical form (not shown). Other wider ribbon or narrower or thicker or thinner ribbon, may be used, however, such as narrow 90 mils by 3 mils ribbon. Also, the other ribbon coatings of other materials that have normal resistance at low temperatures may be used such as stainless-hastalloy B having a vapour deposited $Nb_3Sn$ ¼ mil thick coated thereon and silverplating on the $Nb_3Sn$. Still further materials that can be used for the insulating coating that have normal resistance while the conductor 11 is superconducting are gold, magnesium, iron, nickel, cobalt and alloys thereof. For a 1¼" wide square parallelepiped shaped aperture 91, the turns 93 of the initial coil are 250 in number, to provide 500 turns 93 per current sheet side e.g. side 41. The number of turns in coils 45 thus determines the width of aperture 91 and the overall width of magnet 47 and it is easy to make any size aperture desired merely by increasing or decreasing the number of turns in coils 45. The normal resistance copper coating 17 stabilizes the superconductor 11 and reduces the current degradation in the superconductor 11 that causes a coiled configuration to carry less current than a straight superconductor sample will carry.

The length of the major axis of racetrack 21 determines the length of the quadrupole magnet 47. For example, the ratio of the diameter of coil 21 to the inside length of magnet 47 can approach 0.66 or is greater than $2/\pi$. Thus it is easy to adjust the magnet length to any desired dimensions.

By using extra stuffing of paper, copper or other like materials in the turns in opposite current sheets and no stuffing in the alternate current sheets the aperture 91 can easily be made rectangular. Stuffing means a non-superconducting material inserted for the purpose of enlarging the space between them.

In energizing the conductors 11 of magnet 47, each right angle section 45 has an input lead and an output lead which is connected to a suitable electrical energy source. The source is increased once or repeatedly to the level required to produce the field required in magnet 47. The turns of conductor 11 in each element of the coil 21 have the same current flow therein and the direction in adjacent current sheets are opposite to each other, as shown by the + and · symbols in FIG. 4, the + being into the paper and the · being opposite.

Suitable conventional means, such as switches (not shown), or connections connect the respective right angle sections as shown in FIG. 3 in series. Additional means, such as switches connect the ends of the series connected right angle sections to a source. For example, suitable temperature or magnetic superconducting switches are connected to the ends of the series connected sections, to allow the multipolar magnet 47 to operate in the persistent mode, with subsequent complete disconnection of the above-mentioned conventional power supply.

Figure 7:
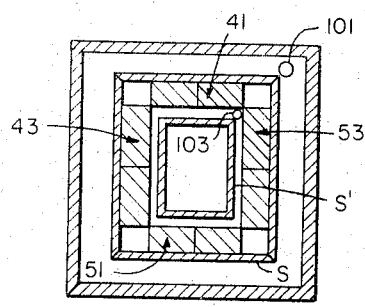
FIG. 7 is a partial cross-section of the cryostatic system for the apparatus of FIG. 3.
Figure 5:
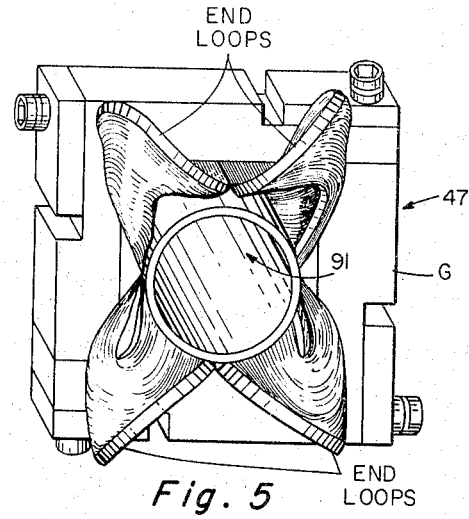
FIG. 5 is a partial end view of the configuration of FIG. 4.

Referring to FIG. 7, a practical embodiment of the magnet of this invention is shown in cross-section wherein the superconducting ribbons of the magnet are potted in a suitable resin such as epoxy or phenyl-formaldehyde. Outer and inner shells S and S' of the same material or a thermally insulating material hold the cooling fluid, which is circulated therethrough from a suitable source (not shown). To this end pipe 101 provides an inlet and pipe 103 provides an outlet. One suitable cooling fluid is liquid helium, which has a temperature when at one atmospheric pressure of 4.2° K. If clamps G are used, the sections 45 are advantageously dipped in conventional transformer oil and inserted in shells S and S' whereby the oil acts like a glue at low temperatures to hold the magnet ribbons together to resist the tendency of the magnet to push itself apart at high field strengths. When it is removed from the low temperature cryostate, the oil becomes liquid and the ribbons may easily be disassembled.

Advantageously, the coils 21 have beeswax applied thereto to stabilize the coil windings for twisting them into the right angle one quarter magnet sections and assembly into the finished magnet configuration 47.

Figure 8:
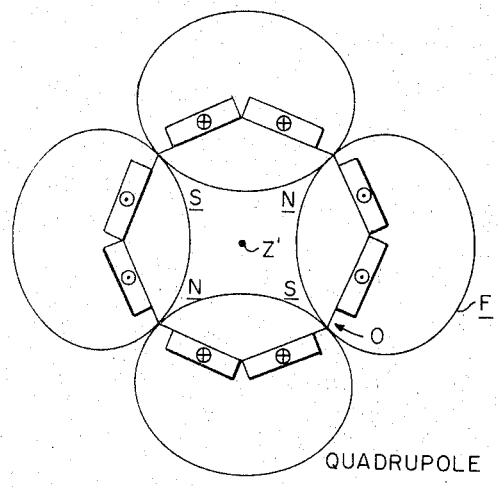
FIG. 8 is a partial end view of another embodiment of this invention.

In another embodiment of this invention shown in FIG. 8, the sides of coils 21 are turned to form an angle larger than 90° and are assembled with like configurations together to form a quadrupole magnet 47 defining a parallelepiped shaped aperture or path having 8 sides for focusing traveling charged particles therein. This has the advantage of a larger bore, smaller casings and smaller fringing end fields. Here there are gaps 0 between the sections 23 and 25.

Figure 9:
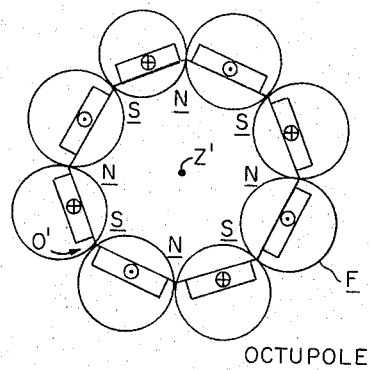
FIG. 9 is a partial end view of another embodiment of this invention.

In another embodiment shown in FIG. 9, there are equal gaps 0' between adjacent current sheets designated + and · and alternate sheets are energized oppositely to provide an octupole magnet. The coils 21 can thus be laid on the sides of a parallelepiped having any number of even sides above two to produce multipolar magnets. Thus parallelepiped apertures 91 can be formed having a cross-section of squares, sextagons, octagons and higher orders. The poles in the above described magnets are designated by the letter N for North and S for South.

In another embodiment not shown, of this invention the conductor 11 comprises a normal resistance conductor bounded by a suitable insulator. Suitable combinations, for example, are copper conductors 11 coated with a non-electrically conducting insulator. Such insulators, for example, comprise non-conducting material such as plastic or ceramics, e.g. $Al_2O_3$. Other suitable conductors 11 are the normal-resistance conductors, comprising silver, gold, magnesium, iron, nickel, cobalt and alloys thereof, such as described in U.S. Patent No. 3,177,408.

In another embodiment not shown, the multipolar magnet of this invention can be provided with an iron member in which the magnet field lines, such as lines F shown in the described figures, may be made to pass, such as for providing increased fields in the aperture of the magnet when normal resistance conductors 11 are employed.

Figure 10:
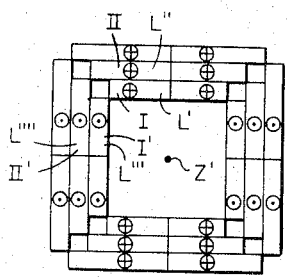
FIG. 10 is a partial cross-section of another embodiment of this invention.

In still another embodiment of this invention shown in FIG. 10, the above described current sheets of this invention are stacked symmetrically outwardly in separate coaxial layers L', L", etc. that increase in width outwardly from the magnet symmetry axis Z'. The first coil element of one coil, e.g. element I is in one sheet e.g. sheet L' and the return element I', is in another sheet at an angle thereto, e.g. sheet L". Further coil elements e.g. II and II' are arranged similarly in sheets in planes at an angle e.g. in sheets L''' and L''''.

The multipolar magnet of this invention is simple, easy to cool, uncomplicated to build, light in weight, compact and easily transportable. Moreover, higher multipolar field gradients and current densities can be achieved therewith than was possible heretofore. Also, easy connections, continuous or pulsed operation and tolerable or no end aberrations are provided by the magnet of this invention. The invention additionally provides a superconducting multipolar magnet. These, such as the described quadrupole magnet of this invention are advantageously used for focusing charged particles in and near charged particle accelerators and storage rings, such as described in the above-referenced patent, and to this end, the multipolar or quadrupole magnet of this invention can be run in pulsed or continuous operation. In continuous operation, this magnet provides a much more efficient magnet than was possible heretofore. The magnet of this invention can also be used in any application where multipolar magnets are desired.

We claim:

1. A quadrupole magnet, comprising means consisting of a system of flat sided rectangular cross-section conducting sheets forming interior angles of 90° defining a parallelepiped shaped aperture in which the conducting sheets comprise coils of electrically conducting ribbons arranged in a plurality of layers in parallel planes at right angles to the major dimension of their respective rectangular cross-section current sheets, said ribbons having a uniform, rectangular cross-section, longitudinally extending superconductor forming major and minor surfaces and correspondingly shaped, spaced apart, normal resistance conductors in direct electrical contact therewith and forming opposite ends.

2. The invention of claim 1 in which said ribbons have means for maintaining said ribbons in their superconducting state comprising an enclosure having an inlet and an outlet for surrounding said current sheets with liquid helium to cool the major surfaces thereof along the minor dimension of the rectangular cross-section of said superconductor and normal resistance conductor.

3. The invention of claim 1 in which said ribbons have means for directly energizing said ribbons to produce electrically conducting sheets at right angles with opposite energization.

4. The invention of claim 1 in which said ribbons form a plurality of continuous, direct, electrical circuit paths having first and second oppositely directed current paths in adjacent sheets forming said angles.

5. The invention of claim 1 in which said conducting sheets forming said angles intersect, are adjacent and energized oppositely.

6. The invention of claim 1 having means for directly energizing said ribbons in a plurality of series connected, continuous, superconducting, electrical circuits having first and second oppositely directed current paths in adjacent conducting sheets at right angles to each other.

7. The invention of claim 1 in which said ribbon forms continuous coils having first and second ends in planes at right angles to each other.

8. The quadrupole magnet comprising, a continuous web of uniform width providing at least one continuous electrically conducting path along the length thereof, disposed so as to provide four electrically conducting sheets in planes forming current paths at right angles, the direction of said current paths in said current sheets defining an aperture for providing a constant gradient magnetic field therein with four, respective equally spaced, alternating north and south poles radiating through the apex of said respective angles around a common axis inside a web width normal to each of said planes.

9. A multipolar magnet, comprising means consisting of a system of flat sided conducting sheets forming interior angles of at least 90° defining equally spaced, 2-n, alternating, north and south poles radiating around a common axis at the center of a constant gradient magnetic field for focusing charged particles in a parallelepiped shaped aperture around when the conducting sheets comprise series connected coils of a superconductor having an insulating coating thereon, each coil having a conducing element in one sheet and a return conducting element in an adjacet sheet.

10. The invention of claim 9 having a plurality of symmetrical stacked conducting sheets in which the stacked current sheets increas in width outwardly from the symmetry aixs.

References Cited
UNITED STATES PATENTS

| | | | |
|---|---|---|---|
| 3,233,154 | 2/1966 | Hnilicka, Jr. | 335—299 X |
| 3,270,304 | 8/1966 | Hoppie | 335—216 |
| 3,283,276 | 11/1966 | Hritzay | 335—299 X |

FOREIGN PATENTS

| | | |
|---|---|---|
| 1,402,426 | 5/1965 | France. |

BERNARD A. GILHEANY, *Primary Examiner.*

G. HARRIS, JR., *Examiner.*